United States Patent [19]

Sakemoto et al.

[11] Patent Number: 4,895,758

[45] Date of Patent: Jan. 23, 1990

[54] MAGNETIC RECORDING MEDIUM

[75] Inventors: Akito Sakemoto; Hideo Fujiwara; Kunio Mizushima, all of Ibaraki; Akira Miyake, Kyoto, all of Japan

[73] Assignee: Hitachi Maxell, Ltd., Osaka, Japan

[21] Appl. No.: 777,017

[22] Filed: Sep. 17, 1985

[30] Foreign Application Priority Data

Sep. 19, 1984 [JP] Japan .................................. 59-194866
Sep. 19, 1984 [JP] Japan .................................. 59-194867
Sep. 19, 1984 [JP] Japan .................................. 59-196150

[51] Int. Cl.[4] ................................................ G11B 5/70
[52] U.S. Cl. ............................... 428/323; 360/125; 360/126; 427/128; 427/131; 428/336; 428/694; 428/900
[58] Field of Search .............. 428/694, 695, 328, 329, 428/900, 327, 336; 427/128, 131

[56] References Cited

U.S. PATENT DOCUMENTS

| 4,325,093 | 4/1982 | Ishii . | |
|---|---|---|---|
| 4,455,345 | 6/1984 | Miyatsuka | 428/900 |
| 4,465,737 | 8/1984 | Miyatuka | 428/402 |
| 4,537,833 | 8/1985 | Kasuga | 428/900 |
| 4,555,431 | 11/1985 | Miyatsuka | 428/900 |
| 4,613,545 | 9/1986 | Chubachi | 428/328 |
| 4,639,389 | 1/1987 | Nishimatsu | 428/900 |
| 4,654,260 | 3/1987 | Chubachi | 428/328 |
| 4,663,209 | 5/1987 | Aonuma | 428/694 |

FOREIGN PATENT DOCUMENTS 0107985  5/1984  European Pat. Off. .

Primary Examiner—Paul J. Thibodeau
Attorney, Agent, or Firm—Birch, Stewart, Kolasch & Birch

[57] ABSTRACT

A magnetic recording medium suitable for high density recording comprising a non-magnetic substrate and a magnetic layer which contains a non-magnetic binder and ferromagnetic powder dispersed therein formed on said substrate, the coercive force of the magnetic layer being from 1,400 to 2,000 oersteds, the residual magnetic flux density being at least 1,100 gausses and a thickness of the layer being at least 0.5 μm, which effectively works when it is used together with a magnetic head, a part of which near a magnetic gap, made of a magnetic material having saturation magnetic flux density of at least 7,000 gausses and which has a magnetic gap length of 0.15 to 0.4 μm.

7 Claims, 2 Drawing Sheets

MAGNETIC RECORDING MEDIUM

BACKGROUND OF THE INVENTION

1. Field of the Invention

The present invention relates to a magnetic recording medium such as a magnetic recording disc or tape. More particularly, it relates to a magnetic recording medium suitable for high density recording. The present invention further relates to a magnetic recording and reproducing apparatus comprising a magnetic recording medium such as a magnetic recording disc or tape and a magnetic head for recording or reproducing signals, by which a high density recording and high output are achieved with good reliability.

2. Discussion of Related Art

For a conventional magnetic recording and reproducing apparatus with a magnetic disc by which high density recording is possible, there is used, as a magnetic material of the magnetic recording medium, cobalt-containing $\gamma$-$Fe_2O_3$ with coercive force of 600-800 oersteds and, as a magnetic head, a ferrite head with a gap length of 1-2 $\mu$m. With such a conventional apparatus, however, recording and reproducing are carried out with a $D_{50}$ of only 20 KBPI. "$D_{50}$" is a recording density at which the output decreases to 50% of recording and reproducing output at a long wavelength and indicates a maximum recording density achieved by a recording and reproducing apparatus. To significantly increase the recording capacity of the magnetic recording medium such as the magnetic disc, high density recording with a $D_{50}$ of 40 KBPI or larger is required.

SUMMARY OF THE INVENTION

Therefore, an object of the present invention is to provide a magnetic recording medium suitable for high density recording.

Another object of the present invention is to provide a magnetic recording and reproducing apparatus comprising a magnetic recording medium, such as a magnetic recording disc or tape, and a magnetic head for recording or reproducing signals, by which a high density recording and high output are achieved with good reliability.

DETAILED DESCRIPTION OF THE INVENTION

Figure 1:
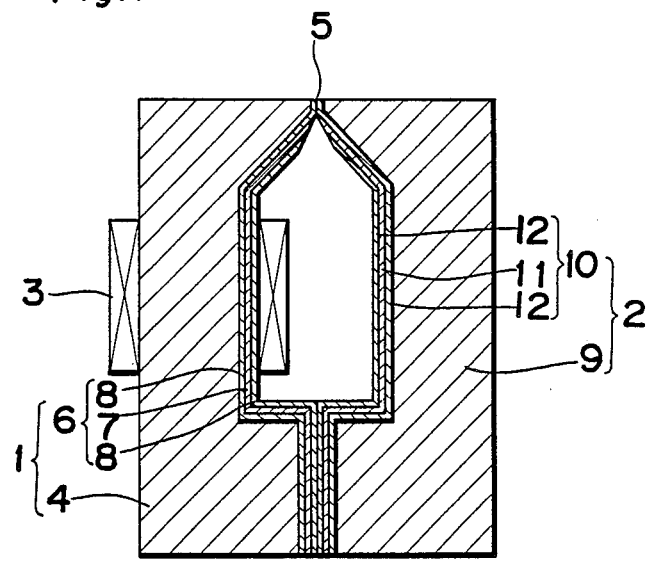
FIG. 1 is a cross section of a magnetic head used according to the present invention.

For producing a magnetic recording medium excellent in high density recording, a medium comprising metal magnetic powder is proposed. However, it is believed that as the thickness of a magnetic layer of the medium is changed to achieve the high density recording, loss of recording density due to thickness varies. Accordingly, the thickness of the magnetic layer is made as thin as possible (Record of Electrical Communication Meeting in Tohoku University, Vol 31, No. 3, page 95 (September 1962)).

Studies have revealed that when the magnetic layer has a coercive force of larger than 1,400 oersteds and a residual magnetic flux density of greater than 1,300 gausses, in case of a thickness of less than 0.5 $\mu$m, the loss of recording density due to thickness varies, while in case of a thickness of 0.5 $\mu$m or larger, the loss of recording density due to thickness does not substantially change and the $D_{50}$ characteristics do not decrease at a constant coersive force and residual magnetic flux density.

Based on the fact that when the thickness of the magnetic layer is at least 0.5 $\mu$m, the $D_{50}$ characteristics do not vary substantially with the thickness, it is possible to form a thick magnetic layer with a thickness of 0.5 $\mu$m or more, instead of a thin one which tends to form a non-uniform layer.

According to the above findings, the above objects are achieved by a magnetic recording medium comprising a non-magnetic substrate and a magnetic layer which contains a non-magnetic binder and ferromagnetic powder dispersed therein, formed on the substrate, the coercive force of the magnetic layer being from 1,400 to 2,000 oersteds, the residual magnetic flux density being at least 1,100 gausses and a thickness of the layer being at least 0.5 $\mu$m.

Further study to improve the S/N ratio of a magnetic disc has revealed that the S/N ratio is influenced by the thickness of the magnetic layer through its surface roughness, which finding is contrary to the conventional observation on the relationship between the thickness of the magnetic layer and the S/N ratio. In other words, as the thickness of the magnetic layer is increased, leveling treatment is effectively carried out so that the surface roughness is minimized and, in turn, the S/N ratio is improved.

Such leveling effect is significant when the thickness is at least 0.5 $\mu$m, particularly at least 1 $\mu$m, and the surface roughness can be made smaller than 0.025 $\mu$m so that S/N ratio is improved.

In addition, it has been found that when the residual magnetic flux density is within a certain specific range, the S/N ratio is further improved. Therefore, in one of the preferred embodiments of the magnetic recording medium of the invention, the residual magnetic flux density of the magnetic layer is at least 1,300 gausses and the surface roughness of the magnetic layer is 0.025 $\mu$m or less.

To improve corrosion resistance of the metal magnetic powder, an oxide protective layer is formed on the surface of each powder particle. Since the oxide protective layer is formed by oxidizing the metal powder, the saturation magnetization of the powder is significantly decreased by oxidization so that suitable residual magnetic flux density is not maintained when contained in the magnetic layer of the magnetic recording medium.

According to our investigation, corrosion resistance of the magnetic powder in the magnetic layer is improved by selecting the amount of the metal powder based on the total amount of the powder and the binder in the magnetic layer instead of providing the oxide protective layer for the powder particle. By this manner, the magnetic recording characteristics are also improved. Therefore, preferably the amount of the magnetic powder is limited so that the residual magnetic flux density is not larger than 2,000 gausses.

In the present invention, the metal magnetic powder may be a conventional one, for example, magnetic powder of iron, nickel, cobalt and chromium and magnetic alloys thereof. A particle size of the metal magnetic powder is usually from 0.1 to 1.0 μm, and its specific surface area measured by a nitrogen adsorption method is not larger than 60 m²/g. When the specific surface area of the magnetic powder is larger than 60 m²/g, the particle size becomes so small that the corrosion resistance of the magnetic layer tends to be deteriorated.

The saturation magnetization of the metal magnetic powder is usually from 100 to 130 emu/g, preferably from 110 to 125 emu/g. When it is less than 100 emu/g, the residual magnetic flux density of the magnetic layer is not made higher than a specific value and the S/N ratio is not improved. When it is larger than 130 emu/g, the residual magnetic flux density is not made lower than a specific value and the corrosion resistance of the magnetic layer is deteriorated.

The amount of the magnetic powder in the magnetic layer is from 65 to 85% by weight, preferably 75 to 82% by weight, based on the total amount of the magnetic powder and the binder. The amount of the magnetic powder is important in view of not only corrosion resistance but also magnetic characteristics. That is, when it is less than 65% by weight, the residual magnetic flux density of the magnetic layer is not made higher than a specific value. When it is larger than 85% by weight, the friction coefficient of the surface of the magnetic layer becomes so large that the traveling property of the magnetic recording medium, particularly the magnetic disc in a disc drive, is deteriorated. In either case, the S/N ratio of the medium is not improved.

The thickness of the magnetic layer should be at least 0.5 μm, preferably from 1 to 5 μm, to effectively improve the S/N ratio. When the thickness of the magnetic layer is less than 0.5 μm, not only the S/N ratio is not improved due to surface roughness but also the magnetic layer does not have enough durability due to weakness of the layer. However, when the thickness of the magnetic layer is larger than 5 μm, the strength of the layer tends to be weakened by calendering. Thus, the magnetic layer preferably has a thickness of 1 to 5 μm, particularly 2.0 to 5 μm.

To achieve the satisfactorily high S/N ratio, the surface roughness of the magnetic layer is preferably less than 0.025 μm. Such, the surface roughness is easily achieved by adequately selecting the calendering conditions such as temperature and pressure.

In case of the magnetic disc, the magnetic powder should be in a substantially non-oriented condition. This is achieved by eliminating an orientating step, which is carried out after coating and drying the magnetic coating composition in the production of the magnetic recording tape. If necessary, the magnetic disc may be subjected to a non-orientation treatment.

In the present specification, the "substantially non-oriented condition" of the magnetic powder means that a ratio of output in one arbitrary direction of the magnetic disc to that in a direction perpendicular to the arbitrary direction is about 0.9 to 1.1.

According to the present invention, the residual magnetic flux density is at least 1,100 gausses, preferably at least 1,300 gausses. As it increases, the S/N ratio is more improved. However, if it exceeds 2,000 gausses, the corrosion resistance is deteriorated. Thus, in view of the corrosion resistance, the residual magnetic flux density of the magnetic layer is preferably from 1,300 to 2,000 gausses, more preferably from 1,300 to 1,800 gausses.

The binder in which the magnetic powder is dispersed is any of those conventionally used such as vinyl chloride copolymers, cellulose resins, polyurethane resins, polyacetal resins, polyester resins, isocyanate compounds and the like. The magnetic coating composition may further contain conventionally used additives such as a lubricant, an abrasive, a surfactant, an antistatic agent and the like.

The magnetic recording medium of the invention may be produced by a per se conventional method. For example, the metal magnetic powder, the resinous binder and optionally other additives, are mixed in a suitable solvent to prepare a magnetic coating composition which is coated on one or both surfaces of the non-magnetic substrate and drying to form the magnetic layer(s) on the substrate, calendering and finally cutting the substrate having the magnetic layer to produce a magnetic recording medium, such as a magnetic disc.

Specific examples of the solvent used in the preparation of the coating composition are ketones, alcohols, and toluene.

The substrate can be made of a resin film such as a polyester or polyimide resin film or of an aluminum foil.

Further study has revealed that, to make full use of the characteristics of the magnetic recording medium, its coercive force, residual magnetic flux density and surface roughness should be correlated with a saturation magnetic flux density of a magnetic material placed near a magnetic gap and a gap length of the magnetic head (i.e., length of a magnetic gap along the traveling direction of the magnetic recording medium), and therefore, these factors should be determined in relation to each other.

Accordingly, in addition to making the magnetic recording medium having the above described characteristics, the magnetic head should be so designed that a part of the magnetic head near the magnetic gap is made of a magnetic material having a saturation magnetic flux density of at least 7,000 gausses and a magnetic gap length of 0.15 to 0.4 μm.

FIG. 1 shows a cross section of the magnetic head according to the present invention. The magnetic head comprises the first core half 1, a second core half 2 and an exciting coil 3 wound around either of the core halves 1 and 2.

The first core half 1 comprises a first core base 4 and a first laminated magnetic film 6 attached on one surface of the base 4 facing the magnetic gap 5. The laminated magnetic film 6 comprises two magnetic layers 8,8 and a non-magnetic layer 7 interposed between the magnetic layers 8,8. The second core half has substantially the same structure as that of the first one, as shown in FIG. 1. Namely, the second core half 2 comprises a second core base 9 and a second laminated magnetic film 10 attached on one surface of the base 9 facing the magnetic gap 5. The laminated magnetic film 10 comprises two magnetic layers 12,12 and a non-magnetic layer 11 interposed between the magnetic layers 12,12.

The core bases 4 and 9 are made of a magnetic material with good magnetic permeability such as manganese-zinc ferrite and nickel-zinc ferrite, or a non-magnetic material such as ceramic or zinc ferrite.

The non-magnetic layers 7 and 11 are made of a non-magnetic material such as silicon dioxide and glass.

The magnetic layers 8 and 12 are made of an amorphous metal alloy having a high saturation magnetic flux density and a large magnetic permittivity. Specific examples of the amorphous metal alloy are those comprising at least one element selected from the group consisting of iron, nickel and cobalt and at least one element selected from the group consisting of phosphorus, carbon, boron and silicon; an alloy comprising one of these element as a primary component and at least one additional element selected from the group consisting of aluminum, germanium, beryllium, tin, molybdenum, idium, tungsten, titanium, manganese, chromium, zirconium, hafnium and niobium; and an alloy comprising cobalt or zirconium as a primary component and at least one of the above described additional elements.

PREFERRED EMBODIMENTS

The present invention will be hereinafter explained further in detail by following examples, wherein parts and % are by weight unless otherwise indicated, specific surface area is measured by the nitrogen adsorption method and "$\sigma_s$", "Hc", "Br", "Oe" "G" stand for "saturation magnetization", "coercive force", "residual magnetic flux density", "oersted" and "gauss", respectively.

EXAMPLE 1

The following components were mixed by a ball mill for 72 hours to homogeneously disperse them.

| Component | Parts |
| --- | --- |
| Metal iron powder | 150 |
| (Specific surface area = 50 m²/g, | |
| $\sigma_2$ = 120 emu/g) | |
| Vinyl chloride/vinyl acetate/vinyl alcohol copolymer | 20 |
| Polyurethane resin | 20 |
| α-Al$_2$O$_3$ powder | 9 |
| 2-Ethylhexyl oleate | 12 |
| Carbon black | 12 |
| Toluene | 220 |
| Cyclohexanone | 220 |

Then, an isocyanate compound (COLONATA, trifunctional low lolecular weight isocyanate compound manufactured by NIPPON POLYURETHANE KOGYO CO.) (10 parts) was added and mixed for additional one hour to prepare a magnetic coating composition. The composition was coated on both surfaces of a film of polyethylene terephthalate with a thickness of 75 μm as a substrate and dried to form magnetic layers. Then, the substrate coated with the magnetic layers was calendered and punched to shape into a magnetic disc with a diameter of 20.02 cm.

The percentage of the magnetic powder in the magnetic layer based on the total amount of the magnetic powder and the binder consisting of the vinyl chloride/vinyl acetate/vinyl alcohol copolymer, the polyurethane resin and the isocyanate compound was 75%.

The used magnetic powder had coercive force of 1,250–1,890 Oe and the saturation magnetization of 78–140 emu/g. By changing the calendering temperature and pressure, magnetic recording media with various surface roughness were produced.

The coercive force, residual magnetic flux density and surface roughness of the sample recording media and D$_{50}$ and head output at various thickness of the magnetic layer are shown in Table 1. The magnetic recording medium with D$_{50}$ larger than 50 KBPI is satisfactory as a recording medium for high density recording. Head output is preferably at least 70 μV in view of amplifier noise.

TABLE 1

| Ex. No. | Coercive force (Oe) | Residual magnetic flux density (G) | Surface roughness (μm) | Thickness of magnetic layer (μm) | D$_{50}$ (KBPI) | Head output (μV) |
| --- | --- | --- | --- | --- | --- | --- |
| 1 | 1,510 | 1,490 | 0.016 | 1.4 | 66 | 79 |
| 2 | 1,740 | 1,650 | 0.002 | 1.3 | 64 | 82 |
| 3 | 1,400 | 1,700 | 0.018 | 1.1 | 56 | 72 |
| 4 | 1,760 | 1,690 | 0.008 | 1.3 | 72 | 79 |
| 5 | 1,890 | 1,350 | 0.012 | 1.5 | 74 | 73 |
| 6 | 1,630 | 1,300 | 0.010 | 1.2 | 60 | 71 |
| 7 | 1,550 | 1,110 | 0.017 | 1.1 | 66 | 60 |
| 8 | 1,710 | 1,560 | 0.025 | 1.3 | 56 | 63 |
| Comp. 1 | 1,250 | 1,730 | 0.019 | 1.0 | 48 | 53 |

The coercive force and residual magnetic flux density were measured by a sample vibration type flux meter, the thickness of the magnetic layer was measured by a tracer type surface roughness meter and the surface roughness was measured by the same surface roughness meter with a stylass diameter of 2 μm, a tracer load of 23 mg, cut off of 0.08 mm at a scanning rate of 0.03 mm/sec. Electromagnetic conversion characteristics were measured by a magnetic head comprising magnetic cores made of iron-nickel alloy with a gap length of 0.3 μm, a tack width of 30 μm and a relative rate against the magnetic recording medium of 3.1 m/sec.

As understood from the results of Table 1, although the conventional magnetic recording medium produced in Comparative Example 1 has large residual magnetic flux density of 1,730 gausses and small surface roughness of 0.019 μm, it has small D$_{50}$ and head output since the coercive force is only 1,250 oersteds.

In contrast, the magnetic layers of the magnetic recording mediums of Examples 1–8 according to the present invention have the coercive force of not less than 1,400 oersteds and the residual magnetic flux density of 1,100 gausses, and therefore have D$_{50}$ of 56 KBPI or larger.

When the coercive force of the magnetic layer exceeds 2,000 oersteds, the core of the magnetic head may be saturated. Therefore, the coercive force should be in a range between 1,400 and 2,000 oresteds. When the residual magnetic flux density is less than 1,100 gausses, sufficient head output is not obtained in connection with amplifier noise.

EXAMPLE 9

In the same manner as in Example 1 but coating the magnetic layer in a thickness of 0.4, 0.5, 4.0 or 5.5 μm, a magnetic recording medium was produced. D$_{50}$ and application ununiformity in terms of modulation of the magnetic layer were measured. The results are shown in Table 2.

TABLE 2

| Sample No. | 1 | 2 | 3 | 4 |
| --- | --- | --- | --- | --- |
| Thickness of magnetic layer (μm) | 0.4 | 0.5 | 4.0 | 5.5 |
| D$_{50}$ (KBPI) | 70 | 68 | 66 | 66 |
| Modulation (%) | 7.3 | 5.8 | 1.7 | 2.2 |

As understood from the above results, the magnetic layers with a thickness of 0.5 μm or larger have substantially the same D$_{50}$ and small modulation which corresponds to small application ununiformity of the layer.

EXAMPLES 10–18

Ten magnetic discs were produced in the same manner as in Example 1 but using metal powder having specific surface area and magnetic characteristics as shown in Table 3 in a predetermined amount and calendering the magnetic layer to obtain surface roughness as shown in Table 3. Hc and Br of the magnetic discs are shown in Table 3.

COMPARATIVE EXAMPLE 2

In the same manner as in Example 1 but using Co-containing $Fe_2O_3$ powder (specific surface area 24 $m^2$, Hc 670 Oe, $\sigma_s$ 78 emu/g) in place of iron powder, a comparative magnetic disc comprising a magnetic layer having surface roughness of 0.018 $\mu$m, Hc of 650 Oe and Br of 800 G.

The magnetic discs produced in Examples 10–18 and Comparative Example 2 were tested on the S/N ratio, $D_{50}$, modulation and corrosion resistance. The results are shown in Table 3.

The corrosion resistance was tested by measuring the decrease of Br after keeping the magnetic disc at 60° C., 90% RH for one week. When the decrease is less than 10%, the corrosion resistance of the magnetic disc is practically sufficient. Other characteristics were measured by means of an iron-nickel alloy made magnetic head with a head gap of 0.3 $\mu$m, and S/N ratio was represented by a relative value against that of Comparative Example 2 being 0 (zero) dB.

In Table 3, an orientation ratio of the magnetic disc, specific surface area, magnetic characteristics of the magnetic powder used and surface roughness and magnetic characteristics of the magnetic layer are also shown.

EXAMPLE 19

In the same manner as in Example 1 but changing a thickness of a magnetic layer, a magnetic disc was produced, and its S/N ratio, surface roughness and durability were measured. Durability of the magnetic disc is measured and evaluated by loading the magnetic disc in a magnetic recording and reproducing apparatus, traveling the disc with contacting it with a magnetic head while observing decrease of reproducing output level due to abrasion of the magnetic disc and measuring traveling time till the reproducing output decreased to 70% of the initial output. The results are shown in FIG. 2.

Figure 2:
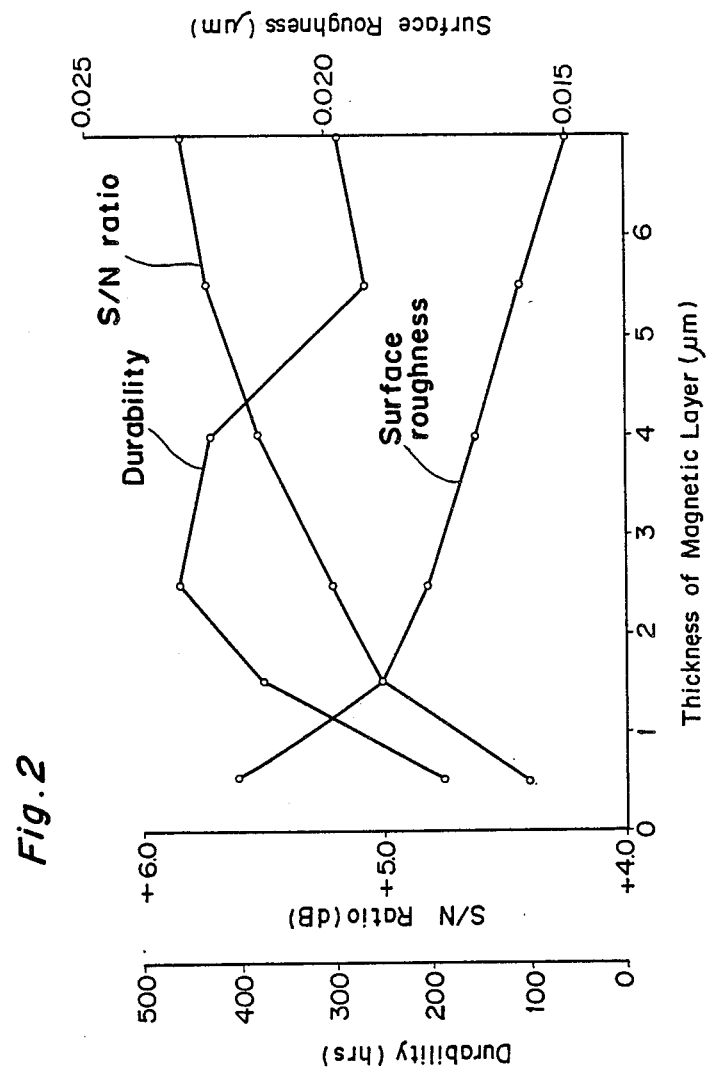
FIG. 2 is a graph showing relationships between the thickness of the magnetic layer, and S/N ratio, surface roughness and durability.

As understood from FIG. 2, when the thickness of the magnetic layer is 1 $\mu$m or larger, the calendering of the layer is effectively carried out so that the surface roughness is decreased and S/N ration and durability are improved. However, the durability tends to decrease when the thickness of the magnetic layer exceeds 5 $\mu$m.

EXAMPLES 20–24 AND COMPARATIVE EXAMPLE 3

Figure 3:
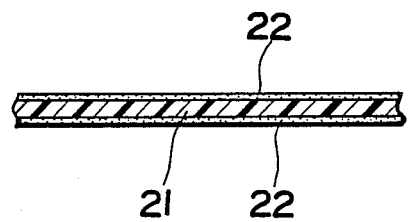
FIG. 3 is an enlarged cross section of a magnetic recording medium according to the present invention.

A magnetic disc was produced in the same manner as in Example 1, an enlarged cross section of which is shown in FIG. 3. The magnetic disc comprises a non-magnetic substrate 21 and magnetic layers 22 formed on both surfaces of the substrate.

The used ferromagnetic metal iron powder had coercive force of 1,100 to 1,750 Oe and saturation magnetization of 100 to 300 emu/g. The surface roughness was adjusted by selecting the calendering temperature and pressure.

In Example 23, there was used a magnetic head having substantially the same structure as shown in FIG. 1 except that a single layer of iron-aluminum-silicon alloy was used in place of the first laminated magnetic film 6 and the second laminated magnetic film 10. In Examples 20–24 and Comparative Example 3, there was used a magnetic head having magnetic thin layers 8 and 12 made of cobalt-zirconium-niobium amorphous alloy. The gap length and saturation magnetic flux density of the magnetic material placed near the magnetic head were varied as shown in Table 4.

With varying Hc, Br and surface roughness (Ra) of the magnetic disc and gap length (gl) and saturation magnetic flux density (Bs) of the magnetic head, head output, S/N ratio. $D_{50}$ and peak shift of the magnetic disc were measured. The results are shown in Table 4.

TABLE 3

| | Example No. | | | | | | | | | |
|---|---|---|---|---|---|---|---|---|---|---|
| | 10 | 11 | 12 | 13 | 14 | 15 | 16 | 17 | 18 | Com. 2 |
| Magnetic powder | | | | | | | | | | |
| Specific surface area ($m^2$/g) | 50 | 55 | 45 | 58 | 18 | 50 | 50 | 50 | 50 | 24 |
| Hc (Oe) | 1,630 | 1,780 | 1,530 | 1,950 | 1,250 | 1,630 | 1,630 | 1,630 | 1,310 | 670 |
| $\sigma_s$ (emu/g) | 120 | 125 | 120 | 115 | 125 | 140 | 95 | 120 | 120 | 78 |
| Magnetic layer | | | | | | | | | | |
| Magnetic powder (%) | 75 | 78 | 75 | 80 | 75 | 88 | 75 | 60 | 75 | 75 |
| Hc (Oe) | 1,510 | 1,700 | 1,410 | 1,900 | 1,180 | 1,490 | 1,510 | 1,580 | 1,220 | 650 |
| Br (G) | 1,520 | 1,650 | 1,700 | 1,380 | 1,690 | 2,200 | 1,250 | 1,200 | 1,480 | 800 |
| Surface roughness ($\mu$m) | 0.018 | 0.020 | 0.018 | 0.015 | 0.018 | 0.020 | 0.017 | 0.022 | 0.030 | 0.018 |
| Orientation ratio | 1.02 | 1.02 | 1.02 | 1.03 | 1.05 | 1.04 | 1.02 | 1.01 | 1.05 | 1.03 |
| Magnetic Disc | | | | | | | | | | |
| S/N ratio (dB) | +5.2 | +6.2 | +6.5 | +4.5 | +5.5 | +7.4 | +1.3 | +1.0 | +4.0 | 0 |
| $D_{50}$ (KBPI) | 65 | 69 | 56 | 73 | 40 | 62 | 68 | 60 | 45 | 18 |
| Modulation | 2.1 | 2.0 | 1.9 | 2.4 | 3.6 | 2.9 | 2.0 | 1.8 | 3.8 | 2.0 |
| Corrosion resistance | 5.4 | 7.9 | 4.8 | 7.0 | 3.2 | 13.9 | 2.4 | 4.4 | 5.9 | 0 |

As understood from the above results, the magnetic layers with Br of smaller than 1,300 gausses in Examples 16 and 17 show comparatively small S/N ratio of +1.3 and +1.0 dB. Although the magnetic layer of Example 18 has Br of larger than 1,350 gausses, its S/N ratio is only +4.0 dB since its surface roughness is larger than 0.025 $\mu$m. In contrast, the magnetic discs of Examples 10–15 have S/N ratio of +4.5 dB or larger. Particularly, when Br of the magnetic layer is larger than 1,500 gausses and the surface roughness is smaller than 0.020 $\mu$m as in Examples 10–14, the S/N ratio is +5.2 dB or larger. The magnetic layers of Examples 10–13 contain the metal magnetic powder in an amount of 65 to 85% so that its corrosion resistance is less than 10%.

TABLE 4

| Example No. | 20 | 21 | 22 | 23 | 24 | Comp. 3 |
| --- | --- | --- | --- | --- | --- | --- |
| Magnetic Disc | | | | | | |
| Hc (Oe) | 1,250 | 1,500 | 1,750 | 1,500 | 1,750 | 1,100 |
| Br (G) | 1,300 | 1,500 | 1,800 | 1,500 | 1,800 | 1,100 |
| Ra (μm) | 0.025 | 0.017 | 0.01 | 0.017 | 0.01 | 0.035 |
| Magnetic Head | | | | | | |
| gl (μm) | 0.15 | 0.25 | 0.4 | 0.25 | 0.5 | 0.15 |
| Bs (G) | 9,500 | 8,500 | 7,500 | 8,500 | 5,000 | 9,500 |
| Head output (mV) | 0.48 | 0.53 | 0.50 | 0.31 | 0.26 | 0.24 |
| S/N ratio (dB) | 66 | 69 | 67 | 65 | 48 | 50 |
| $D_{50}$ (KBPI) | 60 | 57 | 56 | 51 | 32 | 29 |
| Peak shift | 9 | 9 | 11 | 15 | 28 | 31 |

As in Example 24, even if the magnetic disc comprises a magnetic layer having larger coersive force and residual magnetic flux density and small surface roughness, when the gap length of the magnetic head is too long or the saturation magnetic flux density of the magnetic material placed near the magnetic gap is too small, the characteristics of the magnetic disc cannot be effectively brought out so that the head output, S/N ratio, $D_{50}$ and peak shift are deteriorated.

As in Comparative Example 3, even if the magnetic head has a short gap length and the magnetic material placed near the magnetic gap has a large saturation magnetic flux density, when the coercive force or the residual magnetic flux density of the magnetic disc are small or the surface roughness is large, the magnetic head does not effectively work.

On the contrary, when the magnetic disc of the invention is combined with the magnetic head having the gap length of 0.15 to 0.4 μm and the magnetic material placed near the magnetic gap with saturation magnetic flux density of at least 7,000 gausses, the characteristics of the magnetic disc and the magnetic head are effectively brought about.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic disc comprising a non-magnetic substrate having first and second surfaces and a magnetic layer formed on each of said first and second surfaces, said magnetic layer comprising a non-magnetic binder having dispersed therein a ferromagnetic powder having a particle size of from 0.1 to 1.0 μm, said magnetic layer having a coercive force (Hc) of from 1180 to 2,000 oersteds, a residual magnetic flux density (Br) of from 1110 to 2,000 gausses and a thickness of at least 0.5 μm, wherein said ferromagnetic powder is present in said magnetic layer in an amount of from 65–85% by weight based on total weight of powder and binder, has a specific surface area of not larger than 60 m$^2$/g and a saturation magnetization of from 100 to 130 emu/g.

2. A magnetic disc according to claim 1, wherein said magnetic layer has a surface roughness of 0.025 μm or less.

3. A magnetic disc according to claim 1, wherein the thickness of said magnetic layer is from 1 to 5 μm.

4. A magnetic disc according to claim 3, wherein the thickness of said magnetic layer is from 2.0 to 5 μm.

5. A magnetic recording and reproducing apparatus, which comprises a magnetic disc comprising a non-magnetic substrate and a magnetic layer formed thereon, said magnetic layer containing a non-magnetic binder and ferromagnetic powder having a particle size of from 0.1 to 1.0 μm dispersed therein, said magnetic layer having a coercive force of from 1180 to 2,000 oersteds, a residual magnetic flux density (Br) of from 1110 to 2,000 gausses and a thickness of at least 0.5 μm, wherein said ferromagnetic powder is present in said magnetic layer in an amount of from 60–85% by weight based on total weight of powder and binder, has a specific surface area of not larger than 60 m$^2$/g and a saturation magnetization of from 100 to 130 emu/g, and a magnetic head comprising a first core half and a second core half defining a magnetic gap and an exciting coil wound around either of said first and second core halves, each of said core halves comprising a core base and a laminated magnetic film attached to a surface of said core half facing said magnetic gap, that part of said magnetic head near said magnetic gap having a saturation magnetic flux density of at least 7,000 gausses and wherein said magnetic gap length is from 0.15 to 0.4 μm.

6. A magnetic recording and reproducing apparatus according to claim 5, wherein said magnetic film comprises at least two magnetic layers and a non-magnetic layer interposed between said magnetic layers.

7. A magnetic recording and reproducing apparatus according to claim 6, wherein said magnetic layers are made of an amorphous metal alloy having a high saturation magnetic flux density and a large magnetic permittivity.

* * * * *